US010668842B2

(12) United States Patent
Tuman, II et al.

(10) Patent No.: US 10,668,842 B2
(45) Date of Patent: Jun. 2, 2020

(54) ADJUSTABLE LUMBAR SUPPORT FOR A VEHICLE SEAT

(71) Applicant: Sears Manufacturing Co., Davenport, IA (US)

(72) Inventors: William W. Tuman, II, Muscatine, IA (US); Edward A. Stulik, Granite Bay, CA (US); Daniel J. Alexander, Blue Grass, IA (US)

(73) Assignee: Sears Manufacturing Co., Davenport, IA (US)

( * ) Notice: Subject to any disclaimer, the term of this patent is extended or adjusted under 35 U.S.C. 154(b) by 0 days.

(21) Appl. No.: 16/103,955

(22) Filed: Aug. 16, 2018

(65) Prior Publication Data

US 2020/0055430 A1  Feb. 20, 2020

(51) Int. Cl.
*A47C 3/00* (2006.01)
*B60N 2/66* (2006.01)
*A47C 7/46* (2006.01)

(52) U.S. Cl.
CPC ............... *B60N 2/66* (2013.01); *A47C 7/462* (2013.01)

(58) Field of Classification Search
CPC ...... B60N 2/2222; B60N 2/667; B60N 2/666; B60N 2/66
USPC ....... 297/284.8, 284.4, 284.1, 284.2, 354.11, 297/301.5
See application file for complete search history.

(56) References Cited

U.S. PATENT DOCUMENTS

| | | | | |
|---|---|---|---|---|
| 5,011,223 A * | 4/1991 | Kato | ...................... | B60N 2/667 297/284.1 |
| 5,215,350 A * | 6/1993 | Kato | ....................... | B60N 2/66 297/284.1 |
| 5,335,965 A * | 8/1994 | Sessini | .................... | A47C 7/425 297/284.4 |
| 5,651,584 A * | 7/1997 | Chenot | .................... | B60N 2/66 192/45.018 |
| 6,619,739 B2 * | 9/2003 | McMillen | .............. | A47C 7/462 297/284.7 |
| 6,652,029 B2 * | 11/2003 | McMillen | .............. | A47C 7/462 297/284.4 |
| 7,052,087 B2 * | 5/2006 | McMillen | ............ | B60N 2/6673 297/284.4 |
| 7,137,664 B2 * | 11/2006 | McMillen | ................ | B60N 2/76 297/284.4 |
| 9,193,288 B2 * | 11/2015 | Suzuki | ..................... | B60N 2/66 |
| 2002/0093233 A1 * | 7/2002 | Chu | ........................ | A47C 7/46 297/284.4 |

(Continued)

*Primary Examiner* — Chi Q Nguyen
(74) *Attorney, Agent, or Firm* — Lane & Waterman LLP

(57) ABSTRACT

A lumbar support device for a vehicle seat permits vertical and fore-aft adjustment of the support or forces exerted on the back of an operator seated on the vehicle seat. The lumbar support device includes a lumbar panel resiliently flexibly attached to the seat frame and/or seat shell to permit fore and aft movement of the lumbar panel relative to the seat back, the lumbar panel arranged to bear against the seat back, and a cam element having a cam surface bearing against the lumbar panel to apply force to the lumbar panel toward the seat back, the cam element supported on the seat frame and/or seat shell for movement relative to the lumbar panel and relative to the seat shell and/or seat frame, the cam element configured to vary the force applied to the seat back based on the movement of the cam element.

20 Claims, 5 Drawing Sheets

(56) References Cited

U.S. PATENT DOCUMENTS

| | | | | |
|---|---|---|---|---|
| 2003/0117002 A1* | 6/2003 | McMillen | ............... | A47C 7/462 |
| | | | | 297/284.4 |
| 2009/0102258 A1* | 4/2009 | Wissner | ................ | B60N 2/667 |
| | | | | 297/284.1 |
| 2010/0066145 A1* | 3/2010 | Akutsu | ................. | B60N 2/667 |
| | | | | 297/301.5 |

* cited by examiner

ADJUSTABLE LUMBAR SUPPORT FOR A VEHICLE SEAT

BACKGROUND

The present invention is directed generally to vehicle seating. More particularly, the invention is directed to a lumbar support for a vehicle seat.

Driving introduces forces on the body that are not present otherwise, such as accelerations and decelerations as well as lateral forces and whole body vibrations. These forces can increase the load on the spine thereby causing fatigue and pain. Lumbar support, which is intended to help keep the "S" shape of the spine, is important for operators of vehicles not only for comfort, but because proper lumbar support has been shown to decrease muscle activation, decrease tension on ligaments and decrease the pressure on spinal discs. Different methods of providing lumbar seats in vehicles are commonly employed in the industry. For example, both mechanical and pneumatic (an inflated bag) are commonly used to provide lumbar support. These supports can be either manually or electronically activated to gently push the support into the lumbar areas of the lower back.

One common issue with providing lumbar supports is the different sizes and shapes of vehicle operators. Aging individuals tend to have a different spine curvature than their younger counterparts. Additionally, some vehicle operators have existing back ailments or conditions. It is desirable to have an adjustable lumbar support allows the support to accommodate a number of types of operators.

SUMMARY OF THE DISCLOSURE

The present disclosure is directed to a lumbar support device for a vehicle seat that permits vertical and fore-aft adjustment of the support or forces exerted on the back of an operator seated on the vehicle seat. In one aspect, the lumbar support device comprise a lumbar panel resiliently flexibly attached to the seat frame and/or seat shell to permit fore and aft movement of the lumbar panel relative to the seat back, the lumbar panel arranged to bear against the seat back, and a cam element having a cam surface bearing against the lumbar panel to apply force to the lumbar panel toward the seat back, the cam element supported on the seat frame and/or seat shell for movement relative to the lumbar panel and relative to the seat shell and/or seat frame, the cam element configured to vary the force applied to the seat back based on the movement of the cam element.

In certain aspects, the cam element is mounted on a shaft that is pivotably and rotatably supported on the seat shell and/or seat frame. A handle mounted on a free end of the shaft is accessible outside the seat shell for manual actuation by the operator to pivot and rotate the shaft and thereby move the cam element. In another aspect, an adjustment element retains the shaft at different angular positions, which thereby retains the cam element in contact with the lumbar panel at different vertical positions along the panel.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

DETAILED DESCRIPTION

Figure 1:
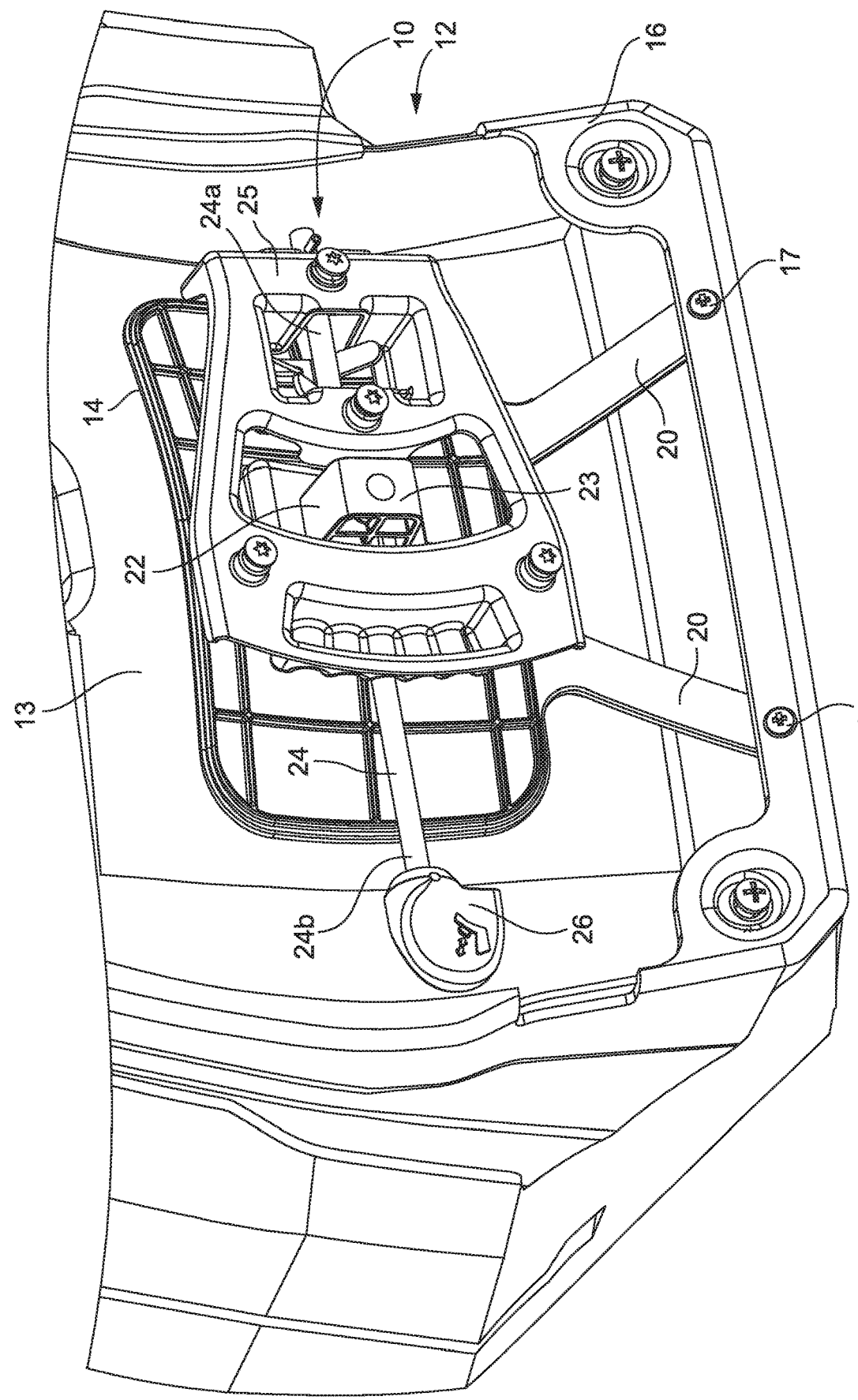
FIG. 1 a partial cut-away rear perspective view toward the front of a vehicle seat incorporating the lumbar support device of the present disclosure.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

Figure 2:
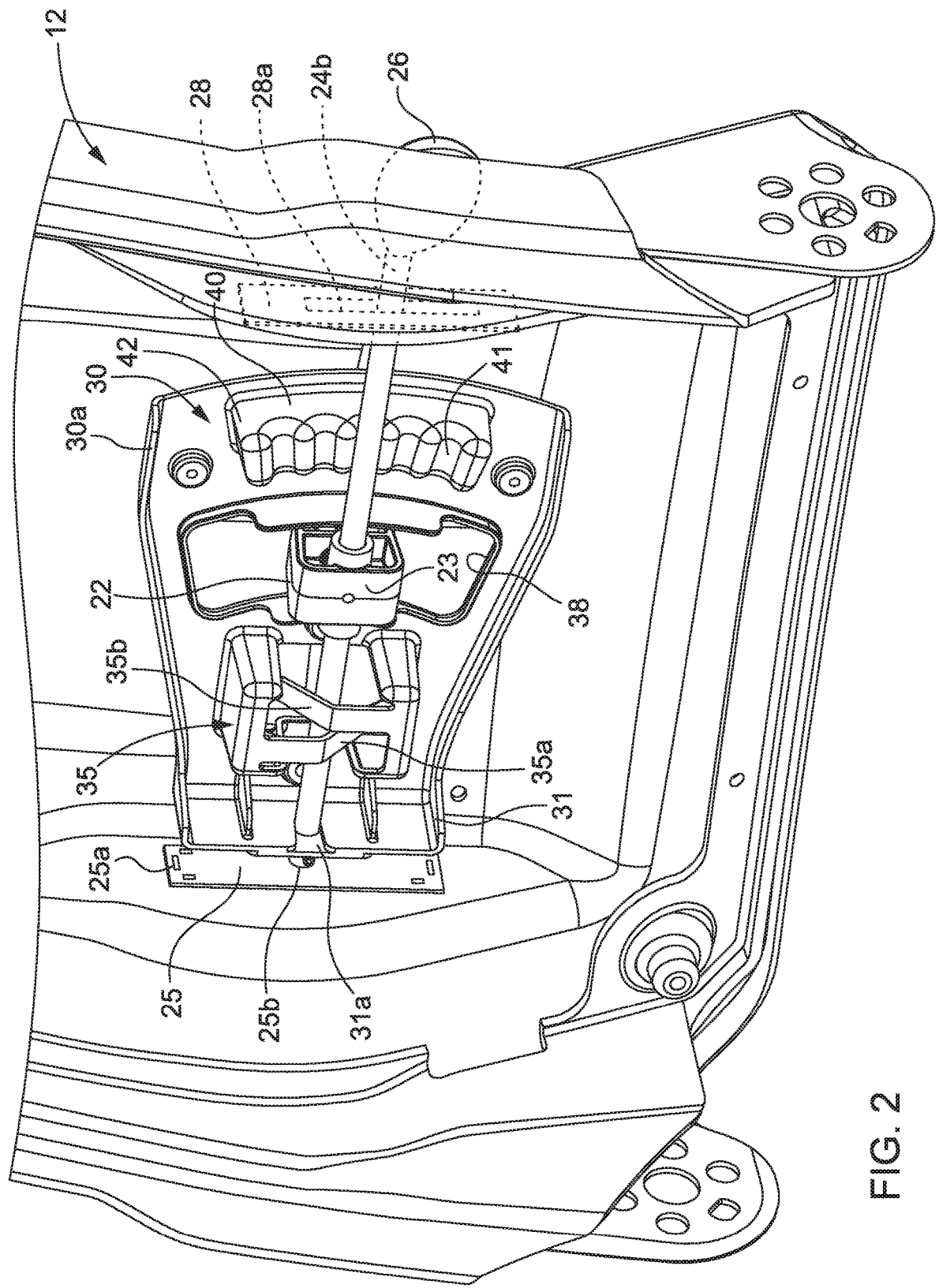
FIG. 2 is a rear perspective view of the vehicle seat with some of the seat structure removed.
Figure 3:
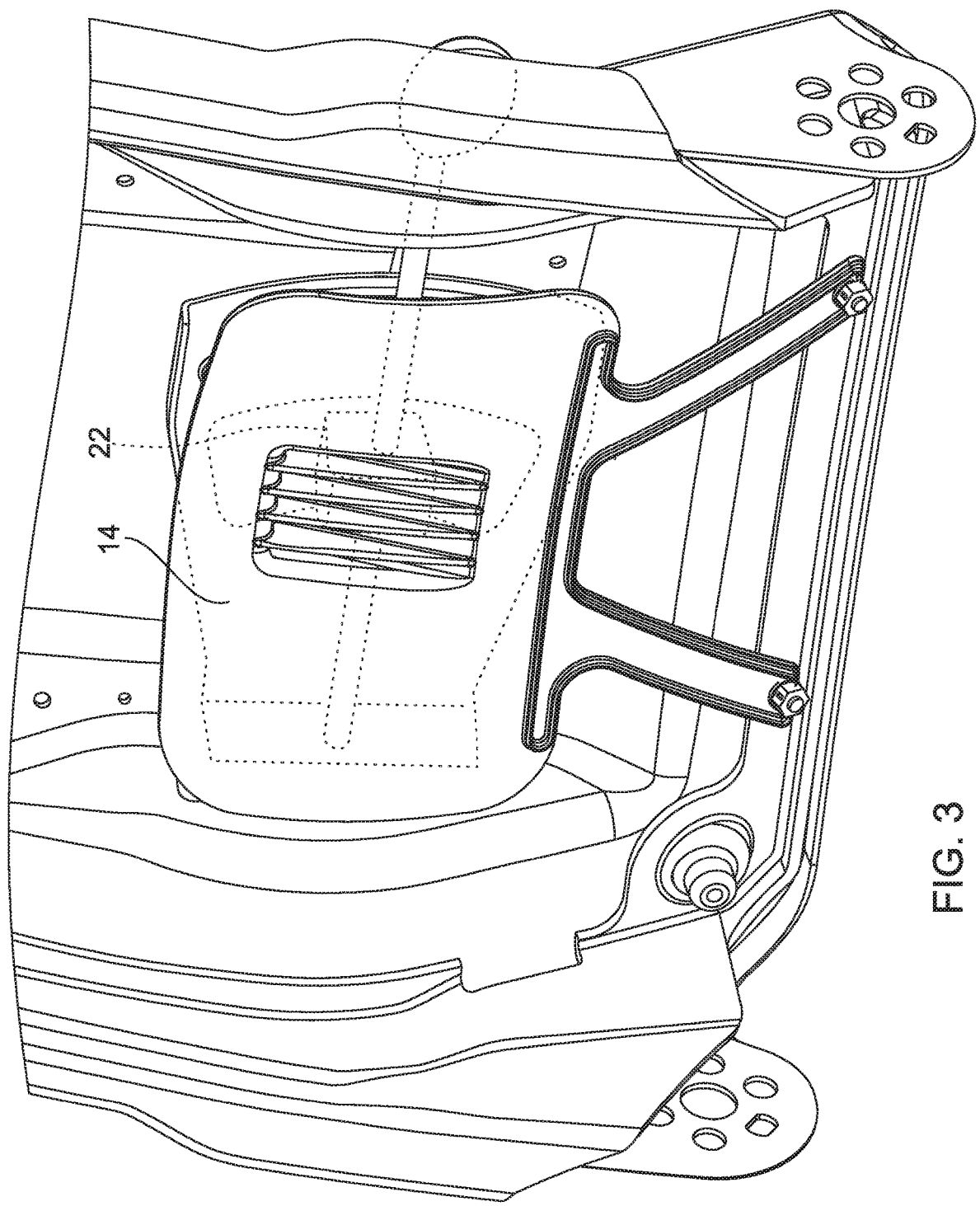
FIG. 3 is a front perspective view toward the back of the vehicle seat showing the lumbar panel and cam element of the lumbar support device of the present disclosure.

One type of lumbar support device 10 is shown in FIGS. 1-2. The device 10 is shown mounted to a seat shell 12 and/or a seat frame 16 that forms part of the vehicle seat. The device 10 includes a lumbar panel 14 that is mounted to the inner frame 16 of the seat shell 12 by fasteners 17 or other suitable methods. In one embodiment the lumbar panel 14 has two legs 20 that are attached to the inner frame 16 with the fasteners 17, so that the lumbar panel is cantilevered on the frame behind the seat back 13 against which the operator rests when seated. The lumbar panel can be shaped in a generally rectangular shape, as shown in FIG. 1, or in any other shape suitable for exerting pressure against or providing support for the lumbar region of the operator seated on the seat. The lumbar panel 14, and particularly the legs 20, may be formed of a material that is firm but with some flexibility to flex with the movement of the operator. For instance, the panel may be formed of a low-density polyethylene (LDPE). Other suitable shapes and materials for the lumbar panel 14 are contemplated by this disclosure however, so long as the objects of the invention are achieved. In particular, the material of the legs 20 must be resiliently flexible to permit adjustment of the lumbar panel 14, as described herein, but sufficiently rigid to support the back of the operator seated on the seat.

Figure 4:
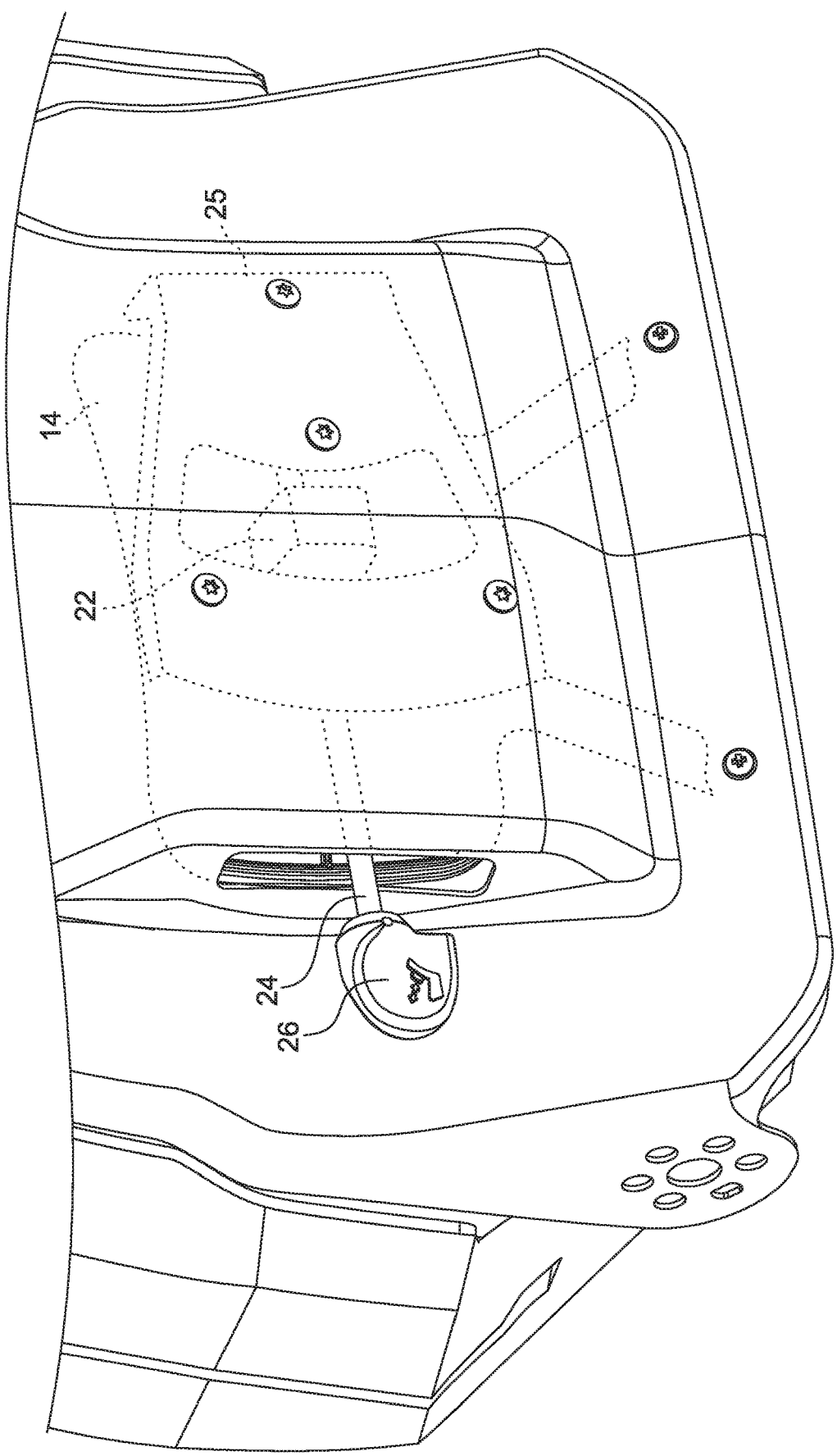
FIG. 4 is a rear perspective view showing the handle of the lumbar support device with the device concealed behind the seat shell of the vehicle seat.

The device 10 further includes a cam element 22 attached to a shaft 24 that is arranged to extend laterally across the seat shell 12. One end 24a of the shaft 24 is pivotably supported by a pivot mount 25 mounted to the seat shell 12. In one embodiment, the pivot mount 25 is a plate 25a defining an opening 25b through which the end 24a of the shaft 24 extends. The opening 25b is sized to allow the shaft 24 to pivot to different angular positions in a generally vertical plane and to rotate about the axis of the shaft. The generally vertical plane is essentially parallel to a plane of the lumbar panel 14. The end 24a of the shaft can be held in position within the opening by lock washers, resilient bushings or similar components positioned on either side of the plate 25a at the opening 25b. The opposite end 24b of the shaft includes a handle 26 affixed thereto for pivoting and rotating the shaft. The shaft 24 has a length sufficient to allow the handle 26 to be accessible by the operator at the side of the seat shell 12, as depicted in FIG. 4.

The end 24b of the shaft extends though a generally vertical slot 28a in a guide element 28 mounted to the seat shell 12. The slot 28a has a length that allows the shaft 24 to be pivoted about the pivot mount 25 at the opposite side of the seat shell. The length of the slot limits the upward and downward movement of the shaft, but is sufficiently long to permit meaningful adjustment of the position of the lumbar panel 14, as discussed herein.

Figure 5:
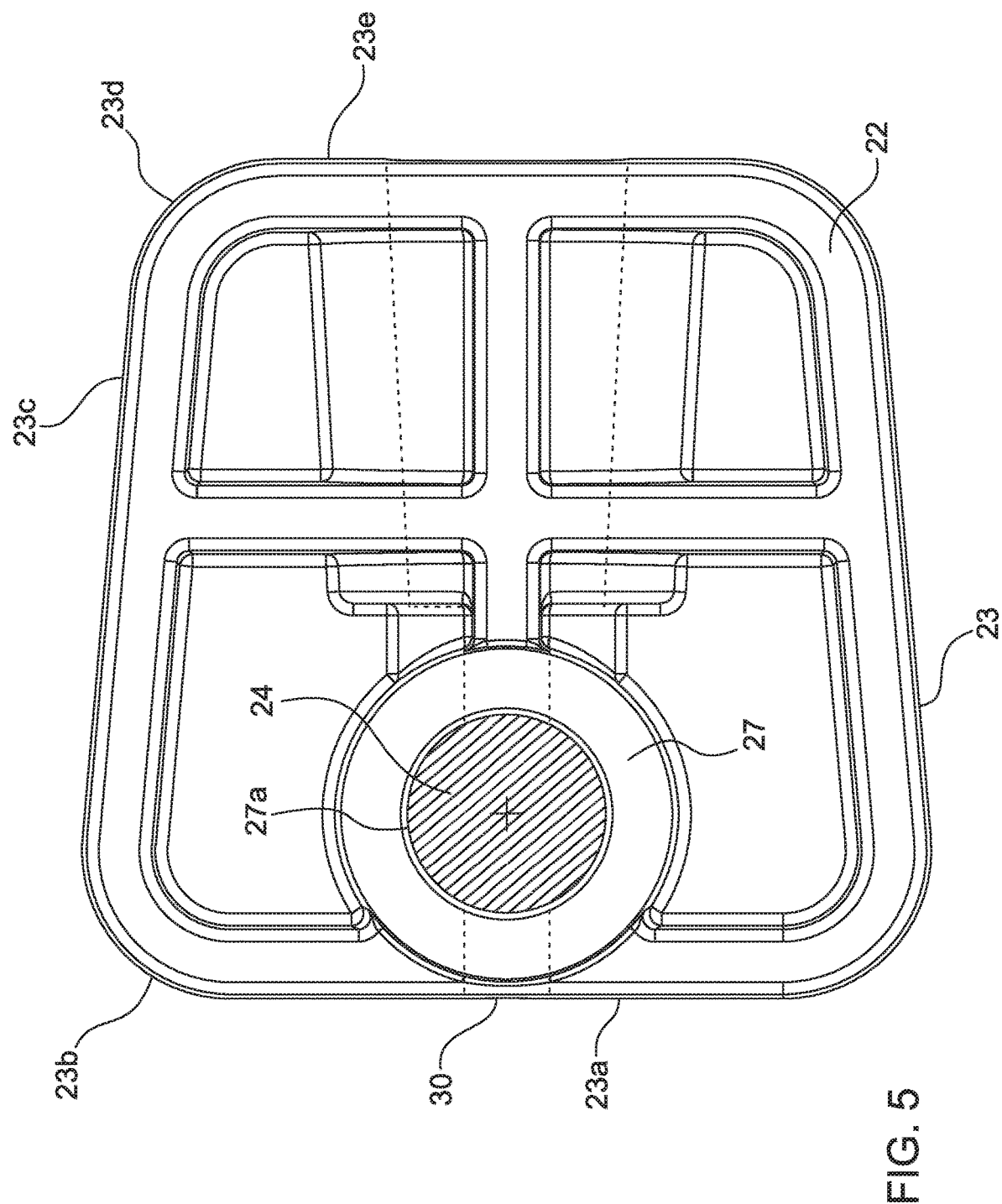
FIG. 5 is an enlarged side view of the cam element of the lumbar support device in FIGS. 1-4.

The cam element 22 is mounted on the shaft 24 such that the cam surface 23 contacts the lumbar panel 14. The cam element is fixed to the shaft so that it can translate with the shaft as the shaft is pivoted and can rotate with the shaft as the shaft is rotated. Thus, as shown in FIG. 5, the cam element 22 includes an interior frame 27 with a bore 27a through which the shaft extends. A set screw 30 extends through the frame to engage the shaft to fix the cam element thereto. The cam element 22 can be shaped in a generally square or rectangular shape and in one aspect is mounted in an off-center position relative to the shaft, as shown in FIG. 5. Mounting the cam element in an off-center position allows for the cam element 22 to exert different pressures on the lumbar panel 14 when the cam element 22 is rotated to different positions. As the cam element is rotated, different portions 23a-23e of the cam surface 23 can contact the lumbar plate. Since the axis of rotation of the cam element is offset, the different surface portions 23a-23e are at different radial distances from the axis of rotation through the bore 23a. Contact with the different portions 23a-23e of the cam surface at the different radial distances will move the lumbar plate to different fore-aft positions. The operator seated in the seat can rotate the shaft 24 via the handle 26, thereby rotating the cam element 22 to vary the surface portion 23a-23e that contacts the lumbar panel 14 thereby exerting varying pressure on the lumbar panel. It can be appreciated that the lumbar panel deflects about the legs 20 depending on the pressure applied by the cam element. The cam element have a different shape, for example, an oval or a segment of an Euler spiral, which can provide the ability to vary the amount of pressure exerted on the lumbar panel without mounting the cam element in an offset position. The cam element 22 is thus shaped such that when it is in contact with the lumbar panel 14, it exerts pressure on the lumbar panel 14 thereby providing lumbar support to the operator.

The device further includes a lumbar adjust frame 30 that includes a plate 30a that is mounted to the back of the seat shell 12 by suitable means, such as conventional fasteners, as best shown in FIG. 2. The shaft 24 extends through an opening or slot 31a in an end flange 31 of the adjust frame 30, with the slot arranged generally horizontally in the fore-aft direction to accommodate pivoting of the shaft 24 about the pivot mount 25. The plate 30a includes a shaft retention component 35 that includes a pair of prongs 35a, 35b that are bent inward to bear against the shaft 24 to confine the pivoting movement of the shaft. The plate 30a further defines an enlarged opening 38 through which the cam element 22 extends for contact with the lumbar panel 14 (not shown in FIG. 2). The opening 38 can be somewhat arcuate, as depicted in FIG. 2, to accommodate movement of the cam element in an arc centered at the pivot mount 25.

The plate 30a of the lumbar adjust frame 30 further includes an adjustment element 40 that is configured to hold the shaft 24 in one of a number of user-selectable positions. In particular, the adjustment element 40 includes a plurality of grooves 41 arranged in an arc corresponding to different angular positions of the shaft during pivoting movement of the shaft 24. Each groove 41 is sized to receive the shaft 24 and maintain the shaft at a discrete angular position. The prongs 35a, 35b of the shaft retention component 35 are configured as spring elements that can be resiliently deflected in the aft direction by pulling the handle 26 back, away from the seat shell 12. By pulling the shaft back or aft, the shaft can clear the ridges 42 between grooves 41 to allow the shaft to be repositioned within one of the grooves 41. The prongs 35a, 35b, deflect aft but the prongs exert a restoring force to help hold the shaft within the selected groove and in contact with the adjustment element 40. The adjustment element 40 thus provides a mechanism for adjusting the height of the cam element 22 relative to the seat shell 12. The operator can thus adjust the location on his/her back where the greatest pressure is applied by the lumbar panel 14.

When an operator sits in the seat with the device 10 of the present disclosure, the operator can adjust the height of the lumbar support by pulling on the handle 26 which will move the shaft 24 out of a groove 41 which then allows the operator to move the shaft to the channel that best corresponds to the desired height of the lumbar support. When the handle is released, the shaft will return to its biased position in the channel. The operator may also rotate the handle which will in turn rotate the shaft and the cam element thereby increasing or decreasing (depending on which way the cam element is rotated) the pressure placed on the lumbar panel. The operator can select the desired amount of pressure on the lumbar panel by rotating the handle.

It will be appreciated by those skilled in the art that various changes and modifications can be made to the illustrated embodiments without departing from the spirit of the present invention. All such modifications and changes are intended to be covered by the appended claims. For instance, the lumbar panel 14, the pivot mount 25, the guide element 28 and the adjustment frame 30 are described as being mounted to the seat shell 12 or to the seat frame 16. However, these components may be mounted to either the seat shell 12 or the seat frame 16 in any manner that retains the functionality of the components. Furthermore, while the present disclosure concerns a vehicle seat, the lumbar support device can be incorporated into conventional seating, such as an office chair or the like.

In a further alternative, the vertical adjustment of the rod can be accomplished by a locking element affixed to the shaft, wherein the locking element engages one or more of the grooves 41 in the adjustment frame 30. In this alternative, the plate 30a supporting the adjustment frame, and particularly the adjustment element 40, can be offset from the shaft with the locking element extending from the shaft to engage the grooves.

In another alternative, the cam element can be vertically guided such as by a vertical strap extending vertically from the seat shell or seat frame or extending vertically along the lumbar panel.

What is claimed is:

1. A lumbar support device for a seat having a seat back and a seat shell mounted to a seat frame, the seat back and seat shell configured to receive an operator with the operator's back against the seat back, comprising:

a lumbar panel resiliently flexibly attached to the seat frame or seat shell to permit fore and aft movement of the lumbar panel relative to the seat back, the lumbar panel arranged to bear against the seat back; and a rotatable cam element having multiple cam surfaces, wherein each cam surface is a different radial distance from the axis of rotation, further wherein each cam surface can bear against the lumbar panel to apply force to the lumbar panel toward the seat back, the cam element supported on the seat frame or seat shell for movement relative to the lumbar panel and relative to the seat shell or seat frame, the cam element configured to vary the force applied to the seat back based on the movement of the cam element.

2. The lumbar support device of claim 1, further comprising:
an elongated shaft extending laterally across the seat shell or seat frame, one end of the shaft pivotably supported on the seat shell or seat frame to pivot relative thereto in a generally vertical plane, and the opposite end of the shaft accessible to the operator to manually pivot the elongated shaft,
wherein the cam element is fastened to the elongated shaft between the one end and the opposite end for movement upon pivoting of the shaft, whereby the cam element applies a force at a different generally vertical location on the lumbar panel as the shaft is pivoted.

3. The lumbar support device of claim 2, further comprising a handle mounted to said opposite end of said shaft for manual engagement by the operator to pivot the shaft.

4. The lumbar support device of claim 2, further comprising a lumbar adjust frame mounted to the seat back or seat frame and configured to receive the opposite end of said shaft, the lumbar adjust frame including a plurality of grooves sized to receive the shaft therein, wherein said plurality of grooves channels are generally vertically spaced to receive the shaft at different angular positions.

5. The lumbar support device of claim 4, further comprising a retention component supported on the seat shell or the seat frame including at least one resiliently deflectable prong, said at least one prong arranged to engage said shaft between said one end and said opposite end to exert a spring force against said shaft toward said lumbar adjustment frame to releasably retain said shaft within one of said plurality of grooves.

6. The lumbar support device of claim 5, wherein said lumbar adjust frame and said retention component are part of a common plate that is mounted on the seat shell or the seat frame.

7. The lumbar support device of claim 6, wherein aid plate defines an opening through which said cam element extends for contact with said lumbar panel.

8. The lumbar support device of claim 2, wherein:
said one end of said shaft is rotatably supported on the seat shell or seat frame to pivot to rotate about the longitudinal axis of said shaft;
whereby rotation of said shaft rotates said cam element fastened thereto so that said different portions of said cam surface bear against the lumbar panel to thereby vary the force applied to the lumbar panel.

9. The lumbar support device of claim 8, further comprising a handle mounted to said opposite end of said shaft for manual engagement by the operator to rotate and pivot the shaft.

10. The lumbar support device of claim 1, wherein said lumbar panel includes at least one resiliently flexible leg connected to said lumbar panel and to a seat shell or a seat frame.

11. A seat comprising:
a seat back and a seat shell mounted to a seat frame, the seat back and seat shell configured to receive an operator with the operator's back against the seat back; and
a lumbar support device including;
a lumbar panel resiliently flexibly attached to the seat frame or seat shell to permit fore and aft movement of the lumbar panel relative to the seat back, the lumbar panel arranged to bear against the seat back; and
a rotatable cam element having multiple cam surfaces, wherein each cam surface is a different radial distance from the axis of rotation, further wherein each cam surface can bear against the lumbar panel to apply force to the lumbar panel toward the seat back, the cam element supported on the seat frame or seat shell for movement relative to the lumbar panel and relative to the seat shell or seat frame, the cam element configured to vary the force applied to the seat back based on the movement of the cam element.

12. The lumbar support device of claim 11, further comprising:
an elongated shaft extending laterally across the seat shell or seat frame, one end of the shaft pivotably supported on the seat shell or seat frame to pivot relative thereto in a generally vertical plane, and the opposite end of the shaft accessible to the operator to manually pivot the elongated shaft,
wherein the cam element is fastened to the elongated shaft between the one end and the opposite end for movement upon pivoting of the shaft, whereby the cam element applies a force at a different generally vertical location on the lumbar panel as the shaft is pivoted.

13. The lumbar support device of claim 12, further comprising a handle mounted to said opposite end of said shaft for manual engagement by the operator to pivot the shaft.

14. The lumbar support device of claim 12, further comprising a lumbar adjust frame mounted to the seat back or seat frame and configured to receive the opposite end of said shaft, the lumbar adjust frame including a plurality of grooves sized to receive the shaft therein, wherein said plurality of grooves channels are generally vertically spaced to receive the shaft at different angular positions.

15. The lumbar support device of claim 14, further comprising a retention component supported on the seat shell or the seat frame including at least one resiliently deflectable prong, said at least one prong arranged to engage said shaft between said one end and said opposite end to exert a spring force against said shaft toward said lumbar adjustment frame to releasably retain said shaft within one of said plurality of grooves.

16. The lumbar support device of claim 15, wherein said lumbar adjust frame and said retention component are part of a common plate that is mounted on the seat shell or the seat frame.

17. The lumbar support device of claim 16, wherein said plate defines an opening through which said cam element extends for contact with said lumbar panel.

18. The lumbar support device of claim 12, wherein: said one end of said shaft is rotatably supported on the seat shell or seat frame to pivot to rotate about the longitudinal axis of said shaft;
whereby rotation of said shaft rotates said cam element fastened thereto so that said different portions of said cam surface bear against the lumbar panel to thereby vary the force applied to the lumbar panel.

19. The lumbar support device of claim 18, further comprising a handle mounted to said opposite end of said shaft for manual engagement by the operator to rotate and pivot the shaft.

20. The lumbar support device of claim 11, wherein said lumbar panel includes at least one resiliently flexible leg connected to said lumbar panel and to the seat shell or the seat frame.

\* \* \* \* \*